J. LABONTÉ.
CUTTING TOOL.
APPLICATION FILED MAY 3, 1921.
1,416,843.
Patented May 23, 1922.
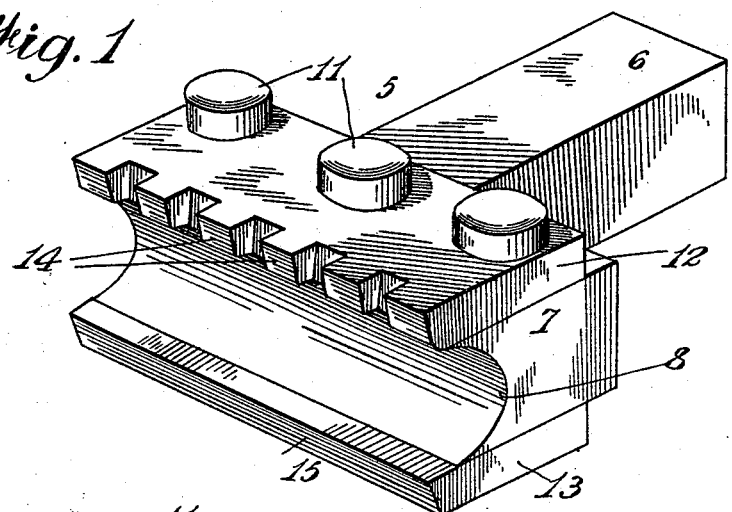
Fig. 1
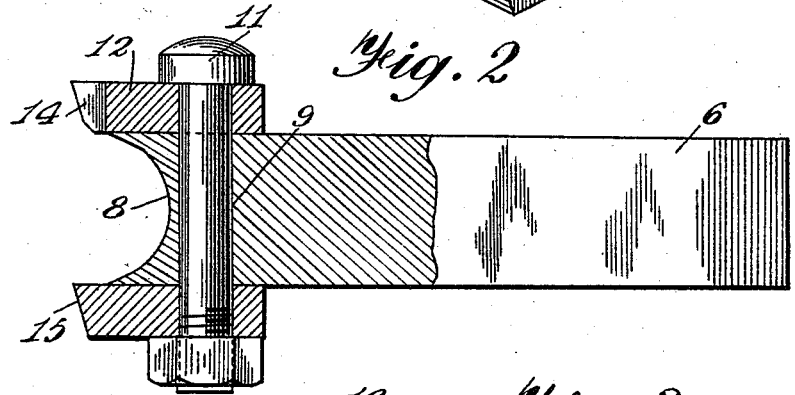
Fig. 2
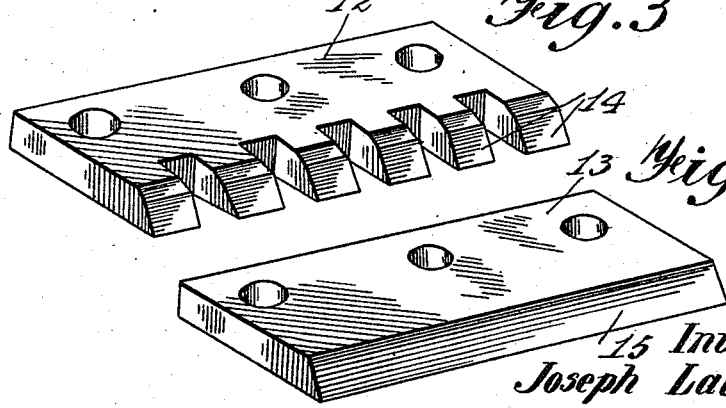
Fig. 3
Fig. 4
Inventor
Joseph Labonté
By William C Sinter
Attorney

UNITED STATES PATENT OFFICE.

JOSEPH LABONTÉ, OF BLAISVILLE, QUEBEC, CANADA.

CUTTING TOOL.

1,416,843.
Specification of Letters Patent.
Patented May 23, 1922.

Application filed May 3, 1921. Serial No. 466,395.

*To all whom it may concern:*

Be it known that I, JOSEPH LABONTÉ, a subject of the King of Great Britain, residing at Blaisville, Riviere du Loup, Province of Quebec, Canada, have invented certain new and useful Improvements in Cutting Tools; and I do hereby declare that the following is a full, clear, and exact description of the invention, such as will enable others skilled in the art to which it appertains to make and use the same.

The present invention relates to new and useful improvements in cutting tools.

The primary object of the invention is the provision of a cutting tool for lathes and the like, more particularly designed for purposes of cutting Babbitt bearings, and other similar articles formed from soft material.

Another object of the invention is the provision of a tool such as above referred to having cutting blades upon the opposite sides thereof, one of which is adapted to quickly cut the rough surfaces from the material worked upon and the other to smooth and polish the said material.

A further object of the invention is the provision of a tool such as above mentioned having a plurality of cutting teeth formed upon a plate attached to one side thereof and a smooth cutting blade attached to the opposite side thereof, for co-operation with the cutting teeth and turning out such articles as soft metal bearings and the like.

A still further object of the invention is the provision of a tool such as above referred to which will be comparatively simple and inexpensive to manufacture, reliable and efficient in use and readily operated.

With the above and other objects in view, the present invention resides in the novel features of construction, formation, combination, and arrangement of parts, to be hereinafter more fully described, claimed and illustrated in the accompanying drawing, forming a part of the present application; and in which, Figure 1 is a perspective view of my improved cutting tool;

Figure 2 is a longitudinal sectional view thereof;

Figure 3 is a detail perspective view of the toothed cutting blade; and,

Figure 4 is a similar view of the smooth cutting blade.

Referring now to the accompanying drawings, by corresponding characters of reference throughout the several views, the numeral 5 designates in general my improved cutting tool which comprises a shank 6 having a head 7 formed upon one end thereof, and disposed transversely thereof.

The forward edge of the head is concaved as shown at 8 and provided with a plurality of transverse openings 9, which extend therethrough and which receive the bolt 11 which holds the cutting blades 12 and 13 in position.

The blade 12 is provided with a plurality of cutting teeth 14, each of which is spaced an equal distance apart, while the blade 13 is provided with a beveled cutting edge 15 of both smooth and sharp formation.

The operation and use of the tool is as follows:

The shank 6 is engaged and held in the usual tool holder of a lathe, or the like and the material to be worked upon is positioned in the lathe, for rotation against the curved edge of the head 7.

In rotation the material first striking against the teeth 14 is quickly cut, while the said material is then smoothed by the blade 15.

This arrangement quickly cuts such soft material as babbitt and the like and prevents the same from breaking.

From the foregoing description taken in connection with the accompanying drawing it will be manifest that a tool for cutting Babbitt bearings and the like is provided which will fulfill all the necessary requirements of such a device.

It should be further understood in this connection that various minor changes in the specific details of construction can be resorted to within the scope of the appended claims, without departing from the spirit or sacrificing any of the advantages of the invention.

Having thus fully described the invention, what I claim as new and desire to secure by Letters Patent is:

1. A tool of the character described, comprising a shank, a head formed upon one end thereof, said head having an outer concaved surface, blades attached to the opposite sides of the head and a series of cutting teeth formed upon the outer edge of one of the blades, substantially as and for the purposes set forth.

2. The combination in a tool of the character described including a shank, a head formed upon the shank and extending at right angles thereto, the outer edge of said head having a concaved surface, blades attached to the opposite sides of the head and extending beyond said concaved surface, one of said blades having a smooth cutting edge, cutting teeth formed upon the edge of the opposite blade and spaced apart substantially as and for the purposes set forth.

In witness whereof I have hereunto set my hand.

JOSEPH LABONTÉ.